April 21, 1953    J. W. DICKEY ET AL    2,635,458
FREEZEMETER

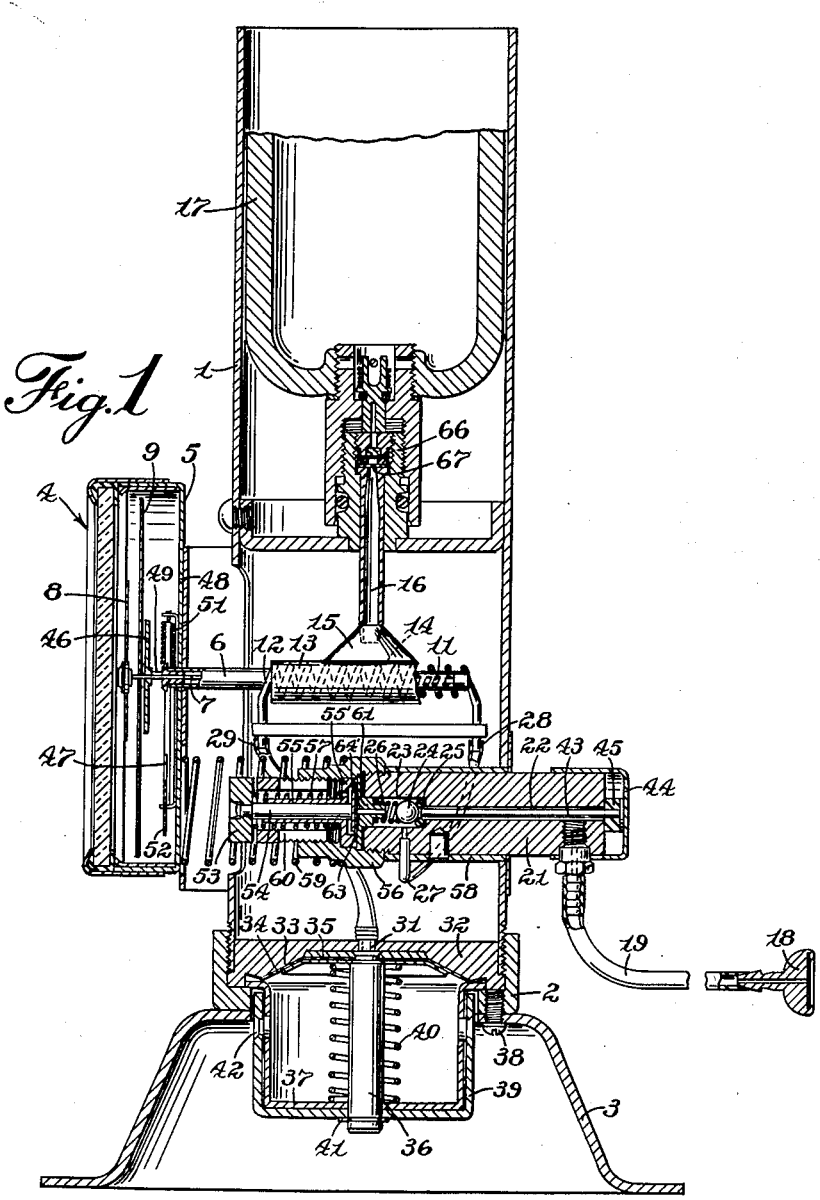

Filed Feb. 29, 1952    3 Sheets-Sheet 2

WITNESS:
Esther M. Stockton

INVENTORS
John W. Dickey
E. Elliott Hood
BY
Clinton L. Janes
ATTORNEY

April 21, 1953  J. W. DICKEY ET AL  2,635,458
FREEZEMETER
Filed Feb. 29, 1952  3 Sheets-Sheet 3
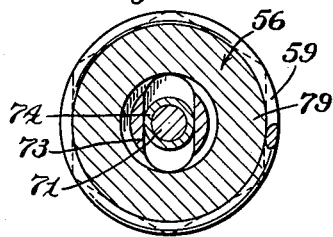
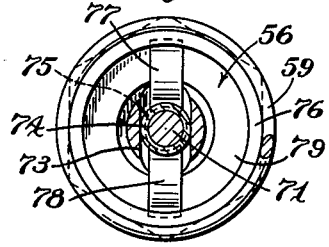
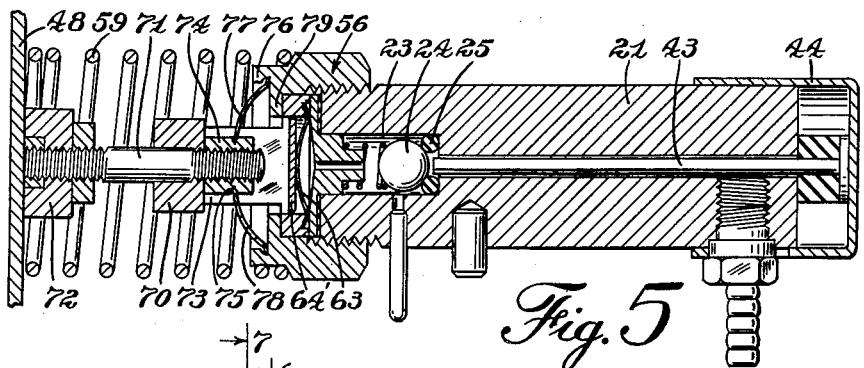
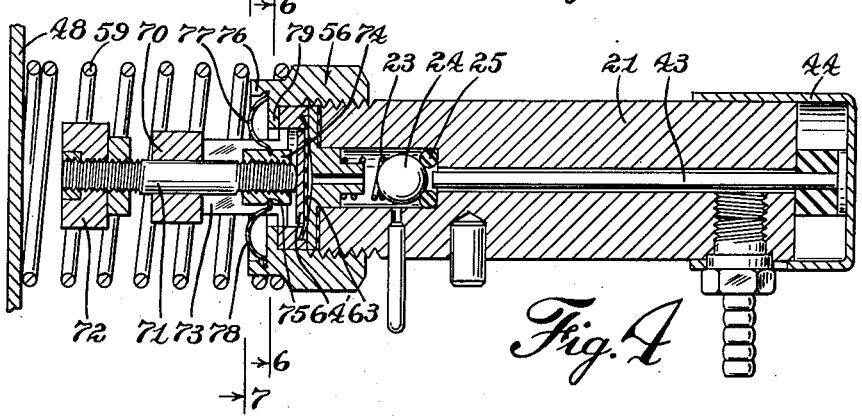
WITNESS:
Esther M. Stockton
INVENTORS
John W. Dickey
E. Elliott Hood
BY
Clinton L. Janes
ATTORNEY Patented Apr. 21, 1953

2,635,458

UNITED STATES PATENT OFFICE 2,635,458

FREEZEMETER

John W. Dickey, Newfield, and E. Elliott Hood, Elmira, N. Y., assignors to Bendix Aviation Corporation, a corporation of Delaware Application February 29, 1952, Serial No. 274,252

11 Claims. (Cl. 73—17)

The present invention relates to a freezemeter and more particularly to an instrument for recording the thawing point of a liquid such as a coolant for internal combustion engines.

The present invention is in the nature of an improvement of the structure shown in the prior application of Dickey, Serial No. 83,986, filed March 28, 1949, and that shown in the joint application of Dickey, Hood, and Gerwig, Serial No. 269,844, filed on February 4, 1952, both applications being assigned to the assignee of the present application.

In the above sole application, Serial No. 83,986, there is disclosed an instrument for freezing a small sample of the liquid to be tested, and for recording its thawing point by automatically arresting a thermometer, which is in thermal contact with the sample, at the instant it thaws sufficiently to flow under a predetermined pressure. The joint application, Serial No. 269,844, above identified is directed more particularly to a magnetically operated form of arresting means for the thermometer.

It is an object of the present invention to provide a freezemeter having a novel and improved form of magnetic arresting means for the thermometer.

It is another object to provide such a device in which the arresting means is positive and uniform in its action, and is brought into operation in response to a very small displacement of the thawed sample.

It is another object to provide such a device in which the arresting action is brought about by the movement of the magnet toward an armature within the thermometer case which forms part of the arresting means, such movement of the magnet being effected by means of a spring, the magnet being normally held in retracted position, and being released by hydraulic pressure built up when the sample starts to flow.

It is a further object to provide such a device in which the retraction of the magnet to its normal position, and the holding and discharge of the sample of liquid are under the control of a unitary manually operable means.

Further objects and advantages will be apparent from the following description taken in connection with the accompanying drawings in which:

Fig. 1 is a vertical substantially mid-sectional view of a preferred embodiment of the invention;

Fig. 4 is a view similar to Fig. 2 showing a modified form of the manual controlling means with the parts in idle or normal position;

Fig. 5 is a similar view showing the parts in operative position to arrest the thermometer needle;

Fig. 6 is a section taken substantially on the line 6—6 of Fig. 4; and

Fig. 7 is a section taken substantially on the line 7—7 of Fig. 4.

Figure 3:
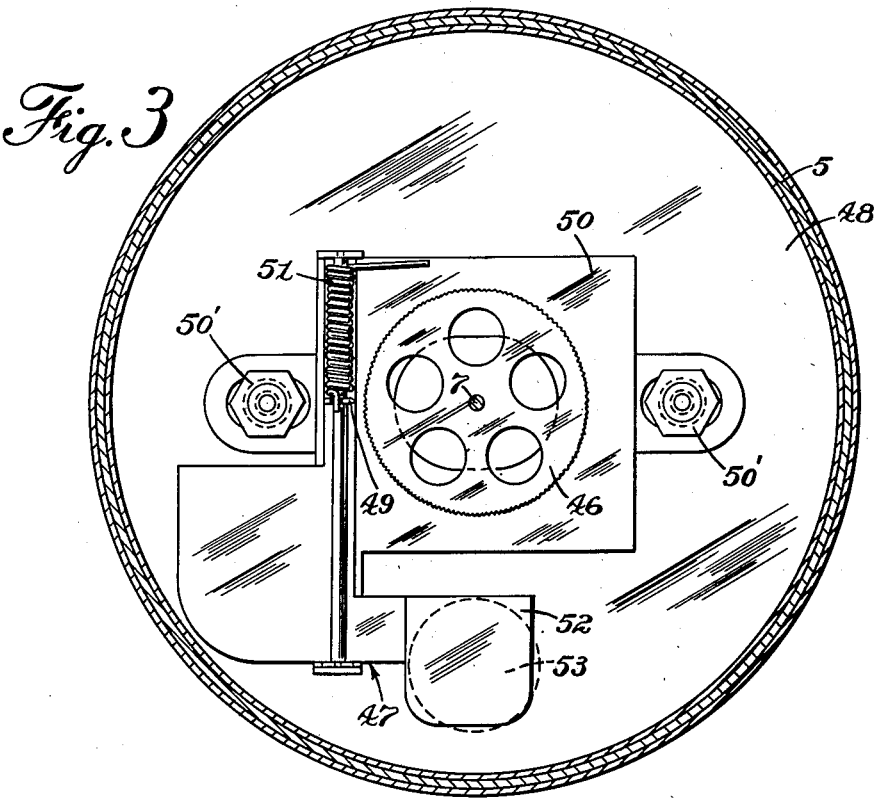
Fig. 3 is an enlarged detail in elevation of the arresting means for the thermometer needle.

In Fig. 1 of the drawing there is illustrated a case 1 of generally cylindrical form mounted as indicated at 2 on a base member 3. A thermometer 4 having a casing 5 of non-magnetic material is rigidly mounted on the instrument case 1 and is provided with a centrally located stem 6 projecting within said case. A needle staff 7 is rotatably mounted within the stem 6 and has a needle 8 fixed on one end thereof within the thermometer casing 5 in position to co-operate with a fixed scale 9.

The opposite end of the needle staff 7 is connected to the stem 6 by a spiral ribbon 11 of bimetal which forms the heat-sensitive element of the thermometer, whereby variations in temperature cause corresponding rotation of the needle 8 with respect to the scale 9.

A freezing tube 12 is coiled around the thermometer stem 6 so as to be in close thermal contact therewith throughout the portion which contains the heat-sensitive element 11. A sheath 13 surrounds the freezing tube 12 and is provided with a slot 14 connected by a tapered duct 15 with the discharge nozzle 16 of a container 17 of liquified gas such as carbon dioxide.

Means are provided for drawing a sample of the liquid to be tested into the freezing tube 12. For this purpose an inlet fitting 18 is connected by a hose 19 to a hollow cylindrical plunger 21 having a passage 22 therethrough. Plunger 21 has an enlarged counterbore 23 containing a ball check-valve 24 which is pressed against an annular seat 25 of elastically deformable material by means of a spring 26. An outlet nipple 27 is mounted in the side of plunger 21 and is connected by a hose 28 to the inlet end of the freezing tube 12.

The outlet end of the freezing tube is connected by a hose 29 to a nipple 31 mounted in a horizontal plate member 32 forming part of the instrument case 1. The plate 32 is hollowed out on its under side as shown at 33 so as to form a chamber which is closed by a flexible diaphragm 34. Means for moving the diaphragm downward in order to draw a sample of liquid into the chamber 33 is provided in the form of a piston member 35 which serves to clamp the central part of the diaphragm to a pump stem 36, slidably mounted in a cup member 37, which is rigidly attached to the plate member 32 as shown at 38. A spring 40 is located between the bottom of the cup 37 and the piston 35 to normally hold the piston in its upper position as illustrated. A manually rotatable cup member 39, loosely fitting on the stationary cup member 37, has a swivelled connection 41 with the outer end of the pump stem 36, and has a pin and inclined slot connection 42 with the inner cup 37 whereby rotation of cup 39 from its normal position, as illustrated, moves the pump stem 36 downward and thereby draws a sample of liquid into the chamber 33.

The check valve 24, 25 normally prevents the flow of liquid back from the chamber 33. In order to enable the liquid to be discharged from the chamber, manually operable means are provided for opening the check valve. As here shown this means comprises a rod 43 which loosely traverses the passage 22 in plunger 21 and projects therefrom into a cap member 44 which is mounted on the free end of the plunger for limited free longitudinal movement. The end of the passage 22 is closed by an elastic packing member 45. Pressure on the cap 44 is arranged to cause the rod 43 to lift the valve member 24 off its seat 25 and thus allow the liquid in chamber 33 to be discharged by the action of spring 40 on piston 35.

Means are provided for arresting the rotation of the thermometer needle staff 7 responsive to hydraulic pressure built up in the counterbore 23 of plunger 21 by the pressure of the spring-pressed pump piston 35 transmitted through the freezing tube 12. For this purpose a toothed disc 46 is rigidly mounted on the needle staff; and an arresting member 47 (Fig. 3), pivotally mounted on the wall 48 of the thermometer casing 5, is provided with a pawl 49 which is movable into engagement with the periphery of the disc 46 to prevent its rotation. A spring 51 normally holds the arresting member 47 in released position, and an armature member 52 forming a part of the arresting member 47 is arranged to move the pawl 49 into operative position when the armature is attracted into engagement with the wall 48 of the thermometer casing.

In order to provide for adjustment of the arresting member laterally with respect to the disc 46, the arresting member is pivotally mounted, as best shown in Fig. 3, between a pair of ears struck up from a plate member 50 which is adjustably clamped to the wall 48 of the thermometer casing as indicated at 50'.

Figure 2:
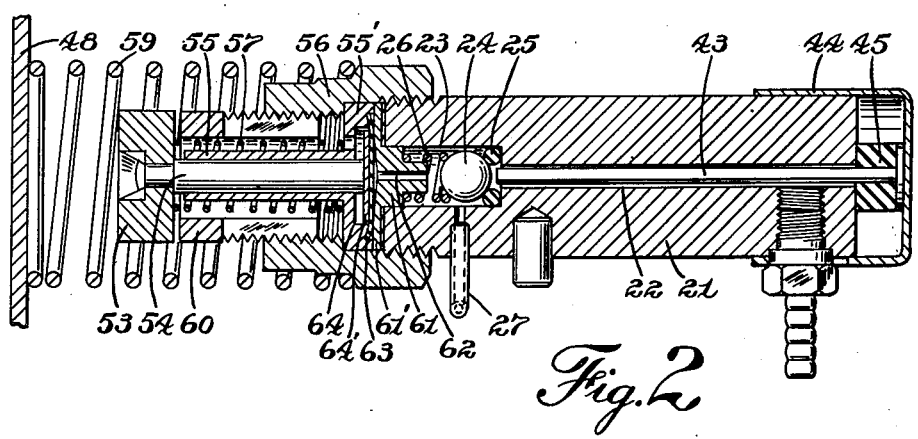
Fig. 2 is an enlarged sectional detail of the manual means for controlling the arresting magnet and the sampling valve.

A permanent magnet 53 (Fig. 2) is fixedly mounted on the end of a stub shaft 54 which is slidable within a sleeve 55 having a flange 55' clamped to the end of plunger 21 by means of a coupling member 56. The shaft 54 is preferably of non-magnetic material permitting free sliding movement of the shaft within the sleeve 55. Sleeve 55 is located in position to support the magnet 53 opposite the armature 52 of arresting member 47 within the thermometer casing, but normally spaced from the casing a sufficient distance to prevent the flux of the magnet from having any significant attractive force for the armature. A spring 57 located on the sleeve 55 urges the magnet 53 toward the thermometer casing.

A tubular armature or keeper element 60 of magnetic material is adjustably threaded in the coupling member 56, loosely surrounding the sleeve 55 and spring 57 and extending into proximity to the magnet 53 when the latter is in idle position. The flux linkage between the magnet and keeper element serves to normally hold the magnet in its idle position against the force of the spring 57, the closeness of such linkage being adjustable by threading the keeper element into or out of the coupling member 56.

The assembly of the plunger 21, sleeve 55, and magnet 53 is mounted for horizontal sliding movement in a guide member 58 (Fig. 1) rigidly mounted in the instrument case 1. A spring 59 normally holds this assembly in the position illustrated in Figs. 1 and 2, but permits movement of the assembly to the left in response to manual pressure on the cap member 44, against the wall 48 of the thermometer casing.

The coupling member 56 incloses a bushing 61 having a flange 61' located between the flange 55' of sleeve 55 and the adjacent end of plunger 21, and having a central passage 62 which communicates with the interior of the counterbore 23. The outer face of the bushing 61 is dished slightly, and a flexible diaphragm 63 is held against said face with its outer edge clamped between the flanges 55' and 61'. The flange 55' is counterbored as shown at 64, and a thrust disc 64', loosely mounted in the counterbore, bears against the diaphragm and forms a stop for the magnet shaft 54, thereby defining the idle position of the magnet 53. Any movement of the diaphragm 63 to the left responsive to hydraulic pressure in the counterbore 23 is transmitted through the thrust disc 64' to the shaft 54, thus moving the magnet 53 away from the keeper 60. The consequent reduction of the mutual attraction of the magnet and keeper permits the spring 57 to expand and project the magnet against the wall 48 of the thermometer case, where the magnet becomes effective to attract the armature 52 and move the arresting member 47 to operative position.

In operation, when it is desired to determine the freezing or thawing point of a liquid (which terms are here considered equivalent) the inlet fitting 18 is dropped into the container of the liquid to be tested, such as an automobile radiator, and the cup member 39 is rotated to withdraw the piston 35 and thus draw a charge of the liquid through the check valve 24, 25 and the freezing tube 12 into the chamber 33. The valve 66 of the carbon dioxide container is then opened to allow discharge of a mixture of gas and snow through an opening 67 into the discharge nozzle 16, and through the expanding duct 15 into the sleeve 13 surrounding the freezing tube 12. The liquid in the tube is thus quickly cooled below the point of congelation, its temperature being indicated by the corresponding rotation of the thermometer needle 8.

The discharge valve 66 of the carbon dioxide container 17 is then closed, and the cup member 39 is released, whereby the force of the spring 40 is allowed to develop a predetermined pressure on the liquid in the chamber 33. This hydraulic pressure is transmitted through the hose 29 to the freezing tube 12, but is not transmitted through the tube 12 because of the solidification of its contents.

The instrument is then allowed to stand until the heat transmitted from the outside atmosphere and from the connected metallic parts of the instrument brings the temperature of the freezing tube and thermometer stem up to the thawing point of the material being tested, the thawing normally progressing inwardly from the ends of the tube. When the sample has softened sufficiently to transmit the hydraulic pressure from the chamber 33 to the counterbore 23 of plunger 21, since egress of the liquid in the counterbore is prevented by check-valve 24, 25, the pressure within the counterbore is effective to move the diaphragm 63 to the left, thus moving the magnet 53 away from the keeper 60. This permits the spring 57 to shift the magnet into engagement with the wall 48 of the thermometer casing where it immediately attracts the armature 52 and causes the needle 8 of the thermometer to be immobilized in the position which indicates the thawing temperature of the coolant liquid.

When the desired information has been recorded, the sample of the liquid is discharged from the instrument, and the parts returned to normal position merely by the application of pressure to the cap 44. This first moves the rod 43 to unseat the valve member 24, allowing escape of the liquid and removing the pressure from diaphragm 63. Upon further movement, the plunger 21 brings the keeper 60 into the zone of influence of the magnet 53, this movement being arrested by the engagement of the inner end of shaft 54 with the thrust disc 64', while the latter is pressed against the flattened diaphragm 63. Upon release of the manual pressure, the spring 59 returns the plunger assembly to normal position, the magnet 53 being carried along by virtue of its attraction to the keeper 60.

The space between the magnet 53 and keeper 60 when the parts are in idle position is adjustable by threading the keeper into and out of the coupling member 56. The spacing is so adjusted as to give the desired sensitivity to the triggering action of the diaphragm 63. By widening the space, the sensitivity may be increased to the point where an almost imperceptible movement of the diaphragm will cause the arresting means to operate.

It has been found in practice that this arrangement provides an excellent means for the final adjustment of the freezemeter to secure standardized performance.

It will be seen that inasmuch as the movement of the magnet to operative position is brought about by spring 57, such movement being merely initiated by the triggering action of the diaphragm 63, it requires only a very minute movement of the material in the freezing tube 12 to bring about the immobilization of the thermometer needle. The indications of the thawing points of various liquids have been found to be exceptionally accurate and consistent when obtained in this manner.

Figs. 4 to 7 inclusive of the drawing illustrate a second embodiment of the magnetic actuator for the thermometer needle arresting means in which a spring toggle device is substituted for the keeper 60 and the spring 57 of the first embodiment.

In Fig. 4 a sleeve 70 is clamped to the manually operable plunger 21 by means of the coupling member 56. A threaded shaft 71 is slidably mounted in the sleeve 70 and has a permanent magnet 72 adjustably mounted on its outer end. The inner portion of the sleeve 70 is diametrically slotted and counterbored as indicated at 73, and a nut 74 having a peripheral groove 75, mounted on the inner end of the shaft 71, is slidably received in said counterbore.

The coupling member 56 is provided with an under-cut flange 76, and a pair of spring members 77 and 78 formed from strips of flat stock are arranged to seat at their outer ends within the flange 76, which thus provides a pivotal coplanar anchorage therefor. At their inner ends the springs extend through the slots in the sleeve 70 and engage in the groove 75 of the nut 74, thus constituting a spring toggle the hinge of which is the point of connection of the springs to the shaft 71. The springs are substantially longer than the radial distance between the nut 74 and flange 76, and when the parts are in idle position, with the toggle slightly displaced from dead-center position in the direction away from the thermometer casing, the springs are bowed outwardly as shown in Fig. 4. The remaining parts of the plunger assembly are the same as in the embodiment previously described and are similarly numbered.

The nut 74 is adjusted on the shaft 71 into such a position that when the inner end of said shaft rests against the disc 64', the inner ends of the springs 77, 78 are displaced slightly to the right of the plane in which their outer ends are located, so that the expansive force of the springs produces an axial component which is effective to hold the shaft in its idle position.

In the operation of this embodiment of the invention, when hydraulic pressure is built up in the counterbore 23 of the plunger 21 consequent to the melting of the frozen sample as above described, the initial movement of the diaphragm 63 and disc 64' moves the shaft 71 to the left and causes the inner ends of the springs 77, 78 to pass through the dead-center position of the toggle formed thereby. The expansive force of the springs then becomes effective to project the shaft 71 to the left until the magnet 72 engages the wall 48 of the thermometer casing as shown in Fig. 5. The arresting means for the thermometer needle is thereby actuated by the flux of the magnet as above described in connection with the first embodiment of the invention.

The operation of venting the sample and returning the parts to idle position is accomplished manually in the same manner as in the first embodiment. Pressure on the cap 44 by the operator causes the rod 43 to lift the ball valve 24 off from its seat 25 and thus permit the sample to be ejected from the instrument. Further pressure on the cap 44 moves the plunger 21 to the left until its motion is arrested by the engagement of the disc 64' with the inner end of the shaft 71.

During this movement the springs 77, 78 are compressed until they pass through the dead-center position of the toggle and slightly beyond, so that their expansive force tends to hold the end of shaft 71 against the thrust disc 64'. The pressure on the cap 44 is then released, and the assembly is returned to idle position by the spring 59, the shaft 71 being retained in contact with the disc 64' by the toggle action of springs 77, 78.

Although but two embodiments of the invention have been shown and described in detail, it will be understood that other embodiments are possible and that various changes can be made in the design and arrangement of the parts without departing from the spirit of the invention.

We claim:

1. In a freezemeter a thermometer having a casing and a tubular stem projecting therefrom, a needle staff journalled in the stem extending into the casing, and a heat-responsive element in the stem connecting the stem to the needle staff; a tube surrounding that portion of the thermometer stem containing the heat-sensitive element, means for drawing and conducting a sample of the liquid to be tested into said tube, means for freezing the liquid in the tube, yielding means for applying a predetermined pressure on the material in the tube, means preventing flow of liquid from the tube responsive to said pressure; means including an armature in the thermometer casing movable to arrest rotation of the needle staff, a magnet mounted for movement toward and away from that portion of the thermometer casing adjacent to said armature, spring means urging the magnet toward said casing, means holding the magnet retracted away from the casing, and means responsive to hydraulic pressure transmitted through said tube for releasing the holding means.

2. A freezemeter as set forth in claim 1 including further manually operable means for retracting the magnet from the thermometer casing, said retracting means including means for venting the sample of liquid from the instrument.

3. A freezemeter as set forth in claim 2 in which the holding means for the magnet is in the form of a keeper of magnetic material which is normally in proximity to the magnet, said keeper also forming part of the manually operable retracting means.

4. A freezemeter as set forth in claim 1 including further a manually operable tubular plunger forming a part of the means for conducting the sample into the freezing tube, means slidably supporting the magnet on the plunger, a check valve in the plunger preventing discharge of the sample of liquid, and unitary means for opening the check valve and moving the plunger toward the thermometer casing.

5. A freezemeter as set forth in claim 4 in which the holding means for the magnet is in the form of a keeper which is movable with the plunger into proximity to the magnet.

6. A freezemeter as set forth in claim 5 in which the keeper is movably mounted on the plunger to adjust its holding effect on the magnet.

7. A freezemeter as set forth in claim 5 in which the keeper is in the form of a hollow cylinder surrounding the magnet spring and having a threaded connection with the movable plunger.

8. In a freezemeter, a thermometer having a heat-sensitive element and an indicator movable thereby, a freezing tube in close thermal connection to said heat-sensitive element, means for drawing a sample of liquid to be tested into said tube, means for freezing the sample in the tube, yielding means for applying pressure on the frozen sample tending to eject it from the tube, means for preventing the ejection of the sample from the freezing tube, means for arresting the movement of said indicator including a magnet and an element movable by the flux of the magnet, means normally holding the magnet out of effective range of said movable element, spring means urging the magnet into position to actuate said element, and means responsive to hydraulic pressure transmitted through the freezing tube when the sample therein thaws, for causing the spring means to become operative to move the magnet into actuating position.

9. A freezemeter as set forth in claim 8 in which the means for holding the magnet in idle position comprises the spring means for moving the magnet into actuating position.

10. A freezemeter as set forth in claim 8, in which the holding and moving means for the magnet comprises a pair of flat spring strips arranged in the form of a toggle, the hinge of which is connected to move the magnet, and the outer ends pivotally anchored; the normal position of the toggle being close to the dead-center position, but displaced slightly therefrom in the direction away from the actuating position of the magnet.

11. In a freezemeter, a thermometer having a heat-sensitive element and an indicator movable thereby, a freezing tube in close thermal connection to said heat-sensitive element, means for drawing a sample of liquid to be tested into said tube, means for freezing the sample in the tube, yielding means for applying pressure on the frozen sample tending to eject it from the tube, means for preventing the ejection of the sample from the freezing tube, means for arresting the movement of said indicator including a magnet and an element movable by the flux of the magnet, a slidable shaft supporting the magnet for movement toward and away from said movable arresting element, a pair of flat springs each connected at one end to a common point of said shaft, and at their other ends being pivotally anchored in co-planar position to form a spring toggle; means responsive to hydraulic pressure transmitted through the freezing tube when the sample therein thaws, for moving the magnet shaft through dead-center position toward the operative position of the magnet, means for arresting such movement of the magnet at its operative position, and manually operative means for thereafter moving the anchorage of the springs to flex them past their dead-center position and then withdrawing the shaft and toggle assembly to idle position.

JOHN W. DICKEY.
E. ELLIOTT HOOD.

No references cited.